United States Patent
Hikita et al.

(10) Patent No.: US 12,083,827 B2
(45) Date of Patent: Sep. 10, 2024

(54) MOTORCYCLE TIRE

(71) Applicant: Sumitomo Rubber Industries, Ltd., Kobe (JP)

(72) Inventors: Masahiro Hikita, Kobe (JP); Neill Rampton, Tonawanda, NY (US)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 17/983,509

(22) Filed: Nov. 9, 2022

(65) Prior Publication Data

US 2023/0143715 A1    May 11, 2023

Related U.S. Application Data

(60) Provisional application No. 63/277,700, filed on Nov. 10, 2021.

(51) Int. Cl.
*B60C 11/00* (2006.01)
*B60C 11/03* (2006.01)

(52) U.S. Cl.
CPC ...... *B60C 11/0083* (2013.01); *B60C 11/0302* (2013.01); *B60C 2011/0016* (2013.01); *B60C 2011/0374* (2013.01); *B60C 2200/10* (2013.01)

(58) Field of Classification Search
CPC ............. B60C 2200/10; B60C 11/0083; B60C 11/0008; B60C 11/005
See application file for complete search history.

(56) References Cited

U.S. PATENT DOCUMENTS

| | | | |
|---|---|---|---|
| 10,946,699 B2 | 3/2021 | Kato | |
| 2014/0182757 A1* | 7/2014 | Mariani | B60C 11/0311 152/209.8 |
| 2019/0263183 A1* | 8/2019 | Kono | B60C 11/033 |

FOREIGN PATENT DOCUMENTS

| | | | |
|---|---|---|---|
| JP | H10193918 | * | 7/1998 |
| JP | 2002331809 A | * | 11/2002 |
| JP | 6859821 B2 | | 4/2021 |

OTHER PUBLICATIONS

Tim Snyder, "Why get wide motorcycle tires?", Oct. 19, 2014, 4 Wheel Online, https://web.archive.org/web/20141019021605/ https://4wheelonline.com/why-get-wide-motorcycle-tires.235963.0 (Year: 2014).*

* cited by examiner

*Primary Examiner* — Cedrick S Williams
*Assistant Examiner* — Thomas Frank Schneider
(74) *Attorney, Agent, or Firm* — Birch, Stewart, Kolasch & Birch, LLP (57) ABSTRACT

A tread surface 20 of the tire 2 includes a center portion C and a pair of shoulder portions S. A contour line of the tread surface 20 is divided into ten parts. Among the ten parts, two parts including an equator PC are represented by arcs, and two parts including ends PE of the tread surface 20, respectively, are represented by arcs. A degree of curvature of each shoulder portion S is higher than a degree of curvature of the center portion C. A ratio of the degree of curvature of the shoulder portion S to a width TW of the tread surface 20 is not less than 50%. A ratio of the degree of curvature of the center portion C to the width TW of the tread surface 20 is not greater than 70%.

4 Claims, 3 Drawing Sheets

MOTORCYCLE TIRE

CROSS-REFERENCE TO RELATED APPLICATIONS

This application claims priority on U.S. Provisional Application No. 63/277,700 filed on Nov. 10, 2021, the entire content of which is incorporated herein by reference.

TECHNICAL FIELD

The present invention relates to motorcycle tires.

BACKGROUND ART

The tread surface of a motorcycle tire has a shape projecting radially outward. During straight running, a center portion of the tread surface comes into contact with a road surface. During cornering, an axially outer portion of the tread surface comes into contact with the road surface.

Running of a motorcycle (hereinafter, also referred to as a vehicle) involves changes in the attitude of the vehicle. During cornering, the vehicle is tilted. During running on a circuit, the rider tilts the vehicle to the limit.

In a state where the vehicle is tilted to the limit (that is, full bank state), an end portion of the tread surface comes into contact with a road surface. When traction is applied to the tire at once in a full bank state, a disturbance such as slipping of the tire and vibration occurs.

The disturbance makes it difficult to control the attitude of the vehicle.

For tires, studies have been conducted to improve transient characteristics and cornering stability (for example, PATENT LITERATURE 1 below).

CITATION LIST

Patent Literature

PATENT LITERATURE 1: Japanese Patent No. 6859821 (U.S. Pat. No. 10,946,699)

SUMMARY OF THE INVENTION

Technical Problem

Attitude control is left to the rider. When traction is applied to the tire at once in a full bank state, the aforementioned disturbance occurs, and thus vehicle attitude control is difficult. In recent years, however, attitude control has increasingly become electronic, and a vehicle itself performs attitude control when a disturbance occurs.

If the tire can exert a high grip force in a full bank state, the vehicle can obtain high traction from the tire. A tire capable of exerting a high grip force in a full bank state is desired.

The rider controls the vehicle while recognizing the road surface condition through the tires. During cornering, the rider drives the vehicle while tilting the vehicle. The transient characteristics of the tires when the running state shifts from cornering to straight running are important.

The present invention has been made in view of such circumstances. An object of the present invention is to provide a motorcycle tire capable of exerting a high grip force in a full bank state without impairing transient characteristics.

Solution to Problem

A motorcycle tire according to an aspect of the present invention includes a tread surface having a shape projecting radially outward. The tread surface includes a center portion including an equator, and a pair of shoulder portions including ends of the tread surface, respectively. A zone from the equator to each end of the tread surface, of a contour line of the tread surface, is divided into five equal sections, whereby the contour line is divided into ten parts. Among the ten parts, two parts including the equator are each represented by an arc, and two parts including the ends of the tread surface, respectively, are each represented by an arc. Each of three parts located between each part including the equator and each part including the end of the tread surface is represented by an arc or a straight line. A degree of curvature of the center portion is represented by an average of radii of the arcs that represent the two parts including the equator, respectively. A degree of curvature of each shoulder portion is represented by a radius of an arc having a larger radius, out of an arc that represents a part including a first end of the tread surface and an arc that represents a part including a second end of the tread surface. The degree of curvature of the shoulder portion is higher than the degree of curvature of the center portion. A ratio of the degree of curvature of the shoulder portion to a width of the tread surface is not less than 50%. A ratio of the degree of curvature of the center portion to the width of the tread surface is not greater than 70%.

Preferably, in the motorcycle tire, at least one of the three parts located between each part including the equator and each part including the end of the tread surface is represented by an arc.

More preferably, in the motorcycle tire, the three parts located between each part including the equator and each part including the end of the tread surface are all represented by arcs.

Preferably, in the motorcycle tire, between the equator and each end of the tread surface, a radius of an arc that represents a part located on the end side of the tread surface is larger than a radius of an arc that represents a part located on the equator side.

Preferably, in the motorcycle tire, a ratio of the degree of curvature of the center portion to the degree of curvature of the shoulder portion is not greater than 50%.

Preferably, in the motorcycle tire, a difference between a hardness of the center portion and a hardness of the shoulder portion is not less than −5 and not greater than 5.

Preferably, in the motorcycle tire, no groove is formed in the parts including the ends of the tread surface, respectively.

Advantageous Effects of the Invention

According to the present invention, a motorcycle tire capable of exerting a high grip force in a full bank state without impairing transient characteristics, is obtained.

DETAILED DESCRIPTION

The following will describe in detail the present invention based on preferred embodiments with appropriate reference to the drawings.

In the present disclosure, a state where a tire is fitted on a normal rim, the internal pressure of the tire is adjusted to a normal internal pressure, and no load is applied to the tire is referred to as a normal state.

In the present disclosure, unless otherwise specified, the dimensions and angles of each component of the tire are measured in the normal state.

The dimensions and angles of each component in a meridian cross-section of the tire, which cannot be measured in a state where the tire is fitted on the normal rim, are measured in a cross-section of the tire obtained by cutting the tire along a plane including a rotation axis, with the distance between right and left beads being made equal to the distance between the beads in the tire that is fitted on the normal rim.

The normal rim means a rim specified in a standard on which the tire is based. The "standard rim" in the JATMA standard, the "Design Rim" in the TRA standard, and the "Measuring Rim" in the ETRTO standard are normal rims.

The normal internal pressure means an internal pressure specified in the standard on which the tire is based. The "highest air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard are normal internal pressures.

A normal load means a load specified in the standard on which the tire is based. The "maximum load capacity" in the JATMA standard, the "maximum value" recited in the "TIRE LOAD LIMITS AT VARIOUS COLD INFLATION PRESSURES" in the TRA standard, and the "LOAD CAPACITY" in the ETRTO standard are normal loads.

In the present disclosure, a tread portion of the tire is a portion of the tire that comes into contact with a road surface. A bead portion is a portion of the tire that is fitted to a rim. A side portion is a portion of the tire that extends between the tread portion and the bead portion. The tire includes a tread portion, a pair of bead portions, and a pair of side portions as portions thereof.

Figure 1:
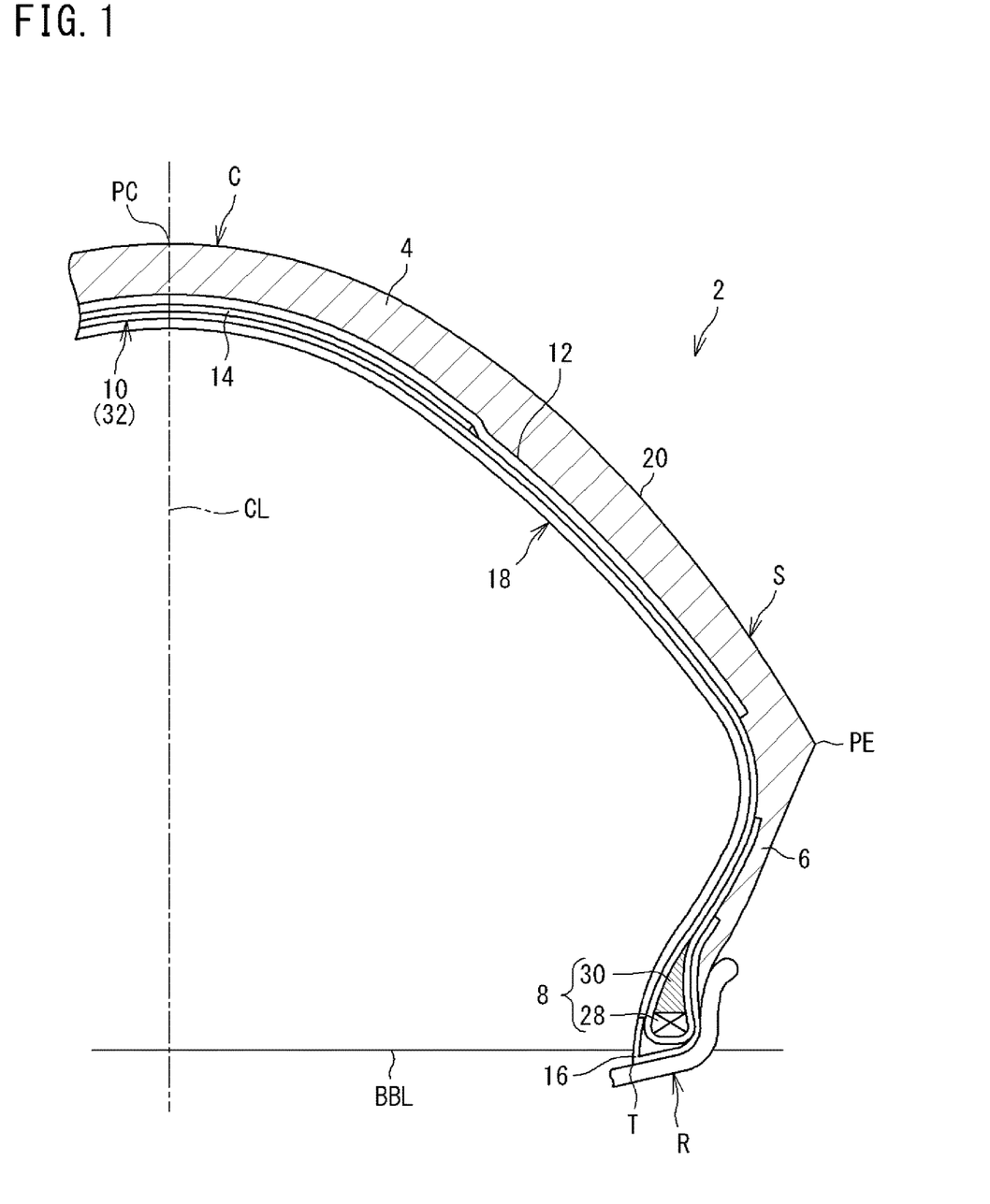
FIG. 1 is a cross-sectional view showing a part of a motorcycle tire according to an embodiment of the present invention.

FIG. 1 shows a part of a tire 2 according to an embodiment of the present invention. The tire 2 is a motorcycle pneumatic tire. The tire 2 is mounted to the rear wheel of a motorcycle.

FIG. 1 shows a part of a cross-section (hereinafter, also referred to as meridian cross-section) of the tire 2 along a plane including the rotation axis of the tire 2. In FIG. 1, the right-left direction is the axial direction of the tire 2, and the up-down direction is the radial direction of the tire 2. The direction perpendicular to the surface of the drawing sheet of FIG. 1 is the circumferential direction of the tire 2. An alternate long and short dash line CL represents the equator plane of the tire 2.

The tire 2 is fitted onto a rim R. The rim R is a normal rim. The interior of the tire 2 is filled with air to adjust the internal pressure of the tire 2. The tire 2 fitted on the rim R is also referred to as a tire-rim assembly. The tire-rim assembly includes the rim R and the tire 2 fitted on the rim R.

In FIG. 1, a solid line BBL extending in the axial direction is a bead base line. This bead base line is a line that defines the rim diameter (see JATMA or the like) of the rim R.

The tire 2 includes a tread 4, a pair of sidewalls 6, a pair of beads 8, a carcass 10, a band 12, an insulation 14, a pair of chafers 16, and an inner liner 18.

The tread 4 is formed from a crosslinked rubber. The tread 4 is composed of a single rubber member formed from a crosslinked rubber. The tread 4 may be composed of a plurality of rubber members aligned in the axial direction. The tread 4 may be composed of a plurality of rubber members stacked in the radial direction. In the tire 2, the tread 4 is composed of a rubber member that is generally used as a rubber member for the tread of a motorcycle tire.

The tread 4 comes into contact with a road surface at an outer surface thereof. The outer surface of the tread 4 is a tread surface 20. The tread 4 includes the tread surface 20 which comes into contact with a road surface.

In FIG. 1, reference sign PC indicates the point of intersection of the tread surface 20 and the equator plane CL. The point of intersection PC corresponds to the equator of the tire 2. The equator PC is the radially outer end of the tire 2. Reference sign PE indicates an end of the tread surface 20. The tread surface 20 has a shape projecting radially outward. The end PE of the tread surface 20 is located radially inward of the equator PC. As shown in FIG. 1, in the tire 2, the end PE of the tread surface 20 is an axially outer end of the tire 2.

In the tread surface 20, a portion including the equator PC is a center portion C, and a portion including the end PE of the tread surface 20 is a shoulder portion S. The tread surface 20 includes the center portion C including the equator PC, and a pair of the shoulder portions S including the ends PE of the tread surface 20, respectively. Each shoulder portion S is located axially outward of the center portion C.

Figure 2:
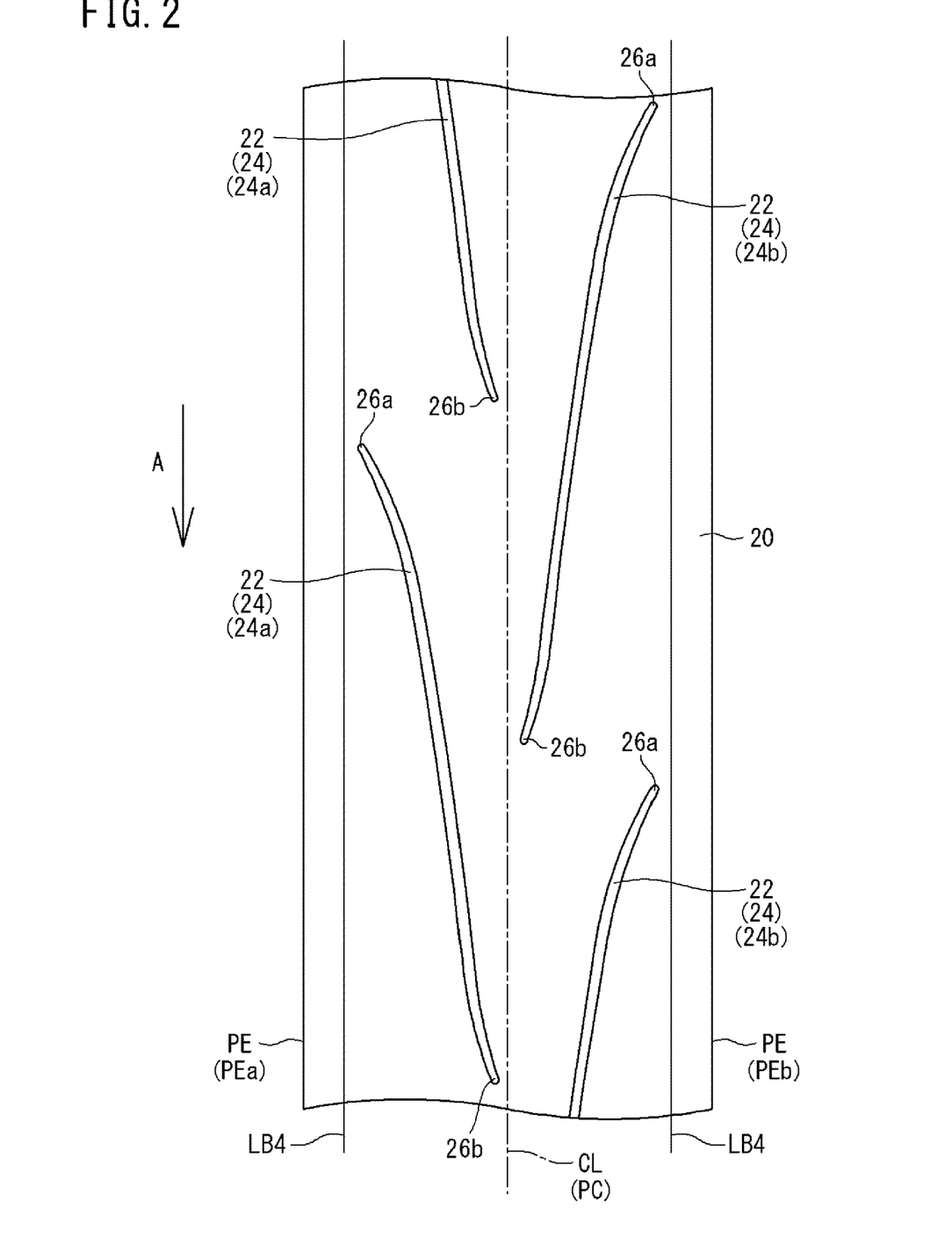
FIG. 2 is a development of a tread surface.

FIG. 2 shows a part of the tread surface 20. In FIG. 2, the right-left direction is the axial direction of the tire 2, and the up-down direction is the circumferential direction of the tire 2. The direction perpendicular to the surface of the drawing sheet of FIG. 2 is the radial direction of the tire 2.

In FIG. 2, an arrow A is the rotation direction of the tire 2. The tread surface 20 comes into contact with a road surface from the lower side to the upper side of the surface of the drawing sheet of FIG. 2. The upper side of the surface of the drawing sheet is a trailing side, and the lower side of the surface of the drawing sheet is a leading side.

Grooves 22 are formed on the tread surface 20. Accordingly, a tread pattern is formed. The tire 2 may be a slick type tire having no groove 22 formed on the tread surface 20.

On the tread surface 20 of the tire 2, inclined grooves 24 are formed as the grooves 22. The entirety of each inclined groove 24 of the tire 2 is located between the equator PC and the end PE of the tread surface 20. The inclined groove 24 is inclined relative to the circumferential direction. A tailing end 26a of the inclined groove 24 is located on the end PE side of the tread surface 20. A leading end 26b of the inclined groove 24 is located on the equator PC side.

Although not described in detail, the specifications such as the position, groove width, groove depth, groove length, etc., of each inclined groove 24 are set as appropriate in consideration of the specifications of the tire 2. The grooves 22, in other words, the tread pattern, may include grooves other than the inclined groove 24.

The inclined grooves 24 include first inclined grooves 24a formed between the equator PC and a first end PEa of the tread surface 20, and second inclined grooves 24b formed between the equator PC and a second end PEb of the tread surface 20.

A plurality of the first inclined grooves 24a are arranged in the circumferential direction at a constant pitch. A first inclined groove 24a located on the trailing side and a first inclined groove 24a located on the leading side are arranged so as to be spaced apart from each other.

A plurality of the second inclined grooves 24b are arranged in the circumferential direction at a constant pitch. A second inclined groove 24b located on the trailing side and a second inclined groove 24b located on the leading side are arranged so as to be spaced apart from each other.

In the tire 2, the first inclined grooves 24a and the second inclined grooves 24b are alternately arranged in the circumferential direction. A first inclined groove 24a and a second inclined groove 24b located near this first inclined groove 24a overlap each other in the axial direction. In the circumferential direction, between the trailing end 26a and the leading end 26b of a first inclined groove 24a, the leading end 26b of the second inclined groove 24b on the trailing side and the trailing end 26a of the second inclined groove 24b on the leading side are located. In the circumferential direction, between the trailing end 26a and the leading end 26b of a second inclined groove 24b, the leading end 26b of the first inclined groove 24a on the trailing side and the trailing end 26a of the first inclined groove 24a on the leading side are located.

Each sidewall 6 is connected to an end of the tread 4. The sidewall 6 is located radially inward of the tread 4. The sidewall 6 extends radially inward from the end of the tread 4.

The sidewall 6 is a rubber member formed from a crosslinked rubber. In the tire 2, the sidewall 6 is composed of a rubber member that is generally used as a rubber member for a sidewall of a motorcycle tire.

Each bead 8 is located radially inward of the sidewall 6. The bead 8 includes a core 28 and an apex 30. The core 28 includes a steel wire which is not shown. The apex 30 is located outward of the core 28 in the radial direction. The apex 30 is tapered outward. The apex 30 is formed from a crosslinked rubber that has high stiffness.

The carcass 10 is located inward of the tread 4 and the pair of sidewalls 6. The carcass 10 extends on and between a first bead 8 and a second bead 8. The carcass 10 has a radial structure.

The carcass 10 includes at least one carcass ply 32. The carcass 10 of the tire 2 is composed of one carcass ply 32. The carcass 10 may be composed of two or more carcass plies 32. The carcass ply 32 of the tire 2 is turned up around each bead 8 from the inner side toward the outer side in the axial direction.

The carcass ply 32 includes a large number of carcass cords aligned with each other, which are not shown. Each carcass cord intersects the equator plane CL. Each carcass cord is a cord formed from an organic fiber. Examples of the organic fiber include nylon fibers, rayon fibers, polyester fibers, and aramid fibers.

The band 12 is located between the tread 4 and the carcass 10 in the radial direction. The band 12 is disposed such that both ends thereof oppose each other across the equator plane CL. The ends of the band 12 are located near the ends PE of the tread surface 20.

The band 12 includes a helically wound band cord which is not shown. The band cord extends substantially in the circumferential direction. Specifically, an angle of the band cord with respect to the circumferential direction is not greater than 5°. The band 12 has a jointless structure.

In the tire 2, a cord formed from an organic fiber is used as the band cord. Examples of the organic fiber include nylon fibers, rayon fibers, polyester fibers, and aramid fibers.

The insulation 14 is located between the band 12 and the carcass 10 in the radial direction. The insulation 14 is disposed such that both ends thereof oppose each other across the equator plane CL. Each end of the insulation 14 is located axially inward of the end of the band 12. The width of the insulation 14 is smaller than the width of the band 12.

The insulation 14 is a rubber member formed from a crosslinked rubber. The insulation 14 relieves strain generated between the band 12 and the carcass 10.

The insulation 14 is not an essential element of the tire 2. In the tire 2, the insulation 14 does not have to be provided. In this case, the entirety of the band 12 is stacked directly on the carcass 10.

Each chafer 16 is located radially inward of the bead 8. The chafer 16 comes into contact with the rim R. The chafer 16 of the tire 2 includes a fabric and a rubber with which the fabric is impregnated.

The inner liner 18 is located inward of the carcass 10. The inner liner 18 forms an inner surface of the tire 2. The inner liner 18 is formed from a crosslinked rubber that has a low gas permeability coefficient. The inner liner 18 maintains the internal pressure of the tire 2.

Figure 3:
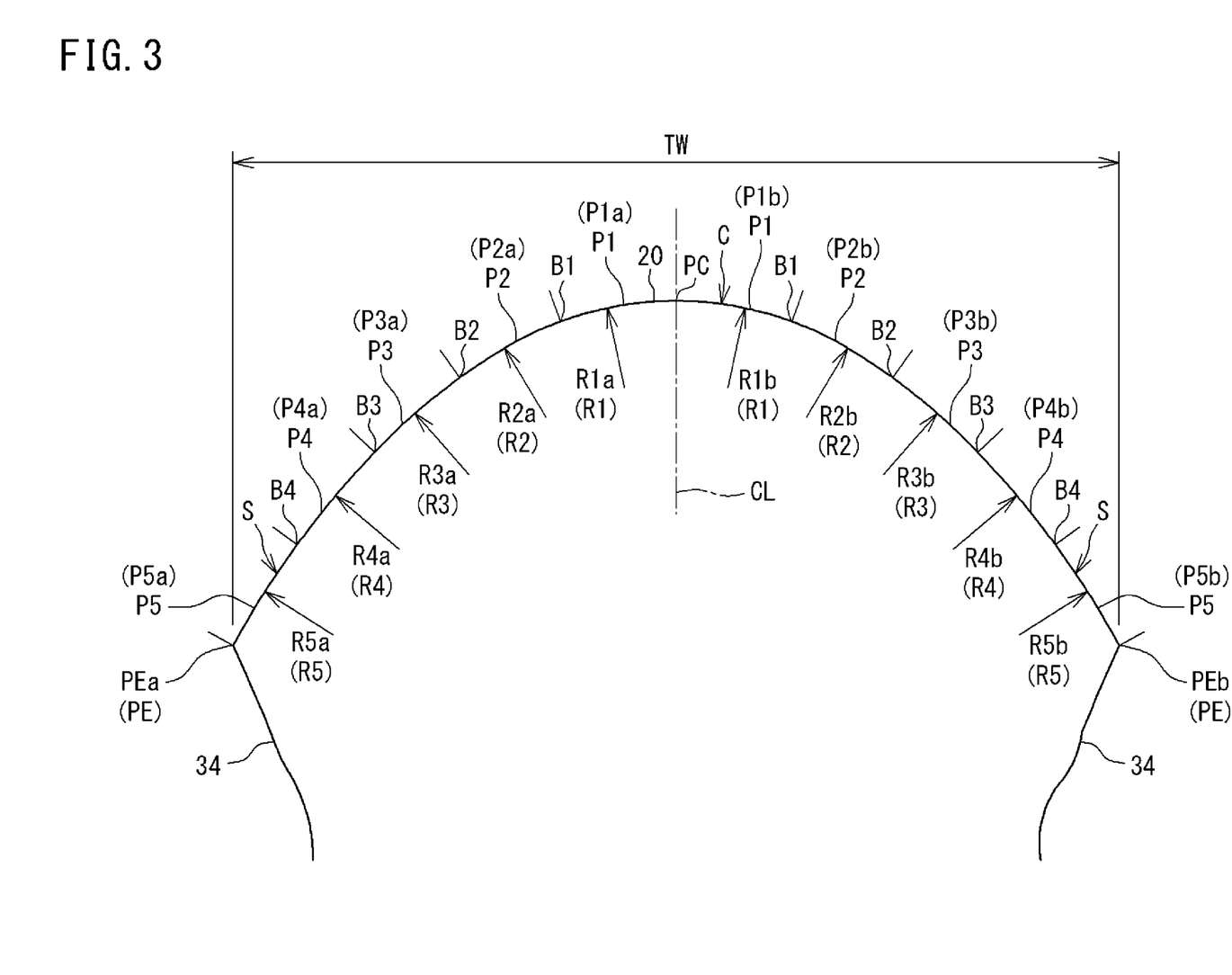
FIG. 3 is a cross-sectional view showing a contour line of a tire outer surface.

FIG. 3 shows a contour line of the tire 2 in the meridian cross-section. The contour line is obtained by measuring the outer surface shape of the tire 2 in the normal state, for example, by a displacement sensor. The contour line represents a virtual outer surface shape obtained on the assumption that there are no irregularities such as grooves and decorations on the outer surface of the tire 2.

Of the contour line, a portion from the first end PEa of the tread surface 20 to the second end PEb thereof is a contour line of the tread surface 20. A portion from each end PE of the tread surface 20 to a toe (position indicated by reference sign T in FIG. 1) of the tire 2 corresponds to a side surface 34, and a contour line of a part thereof is shown in FIG. 3.

The tread surface 20 and a pair of the side surfaces 34 form the outer surface of the tire 2. The outer surface of the tire 2 is shaped by the cavity face of a mold (not shown) used for producing the tire 2. A contour line of the cavity face is formed by smoothly connecting a plurality of arcs and straight lines. The inner surface of the tire 2 is shaped by the outer surface of an expanded bladder or a rigid core. The boundary between the outer surface and the inner surface of the tire 2 is the above-described toe T.

In FIG. 3, a length indicated by a double-headed arrow TW is the width of the tread surface 20. The width TW of the tread surface 20 is the distance in the axial direction from the first end PEa of the tread surface 20 to the second end PEb thereof.

Of the contour line of the tread surface 20, a zone from the equator PC to the first end PEa of the tread surface 20 is a first zone, and a zone from the equator PC to the second end PEb of the tread surface 20 is a second zone. In the tire 2, by dividing each zone into five equal sections, five parts are formed in each zone. Accordingly, the contour line of the tread surface 20 is divided into ten parts.

The five parts included in each zone are a first part P1, a second part P2, a third part P3, a fourth part P4, and a fifth part P5 from the equator PC toward the end PE of the tread surface 20.

In FIG. 3, reference signs B1, B2, B3, and B4 indicate the boundaries between the adjacent parts. The first part P1 connects the equator PC and the boundary B1. The second part P2 connects the boundary B1 and the boundary B2. The third part P3 connects the boundary B2 and the boundary B3. The fourth part P4 connects the boundary B3 and the boundary B4. The fifth part P5 connects the boundary B4 and the end PE of the tread surface 20. The first part P1 includes the equator PC. The fifth part P5 includes the end PE of the tread surface 20.

In the tire 2, among the ten parts included in the contour line of the tread surface 20, a first part P1$a$ of the first zone is represented by an arc having a radius R1$a$. A first part P1$b$ of the second zone is represented by an arc having a radius R1$b$. A fifth part P5$a$, of the first zone, including the first end PEa of the tread surface 20 is represented by an arc having a radius R5$a$. A fifth part P5$b$, of the second zone, including the second end PEb of the tread surface 20 is represented by an arc having a radius R5$b$.

In the tire 2, the two first parts P1 including the equator PC are each represented by an arc, and the two fifth parts P5 each including the end PE of the tread surface 20 are each represented by an arc.

In the tire 2, in the first zone, a second part P2$a$ is represented by an arc having a radius R2$a$, a third part P3$a$ is represented by an arc having a radius R3$a$, and a fourth part P4$a$ is represented by an arc having a radius R4$a$. In the second zone, a second part P2$b$ is represented by an arc having a radius R2$b$, a third part P3$b$ is represented by an arc having a radius R3$b$, and a fourth part P4$b$ is represented by an arc having a radius R4$b$. In other words, the second part P2, the third part P3, and the fourth part P4 which are located between the first part P1 and the fifth part P5 of each zone are each represented by an arc. In the tire 2, all the five parts included in each zone are represented by arcs.

In the tire 2, between the first part P1 and the fifth part P5 of each zone, the second part P2 may be represented by a straight line, the third part P3 may be represented by a straight line, or the fourth part P4 may be represented by a straight line. The second part P2 and the third part P3 may be represented by straight lines, the third part P3 and the fourth part P4 may be represented by straight lines, or the fourth part P4 and the second part P2 may be represented by straight lines. The second part P2, the third part P3, and the fourth part P4 may be represented by straight lines. The second part P2, the third part P3, and the fourth part P4 which are located between the first part P1 and the fifth part P5 of each zone are each represented by an arc or a straight line.

In the present disclosure, whether a part included in the contour line of the tread surface 20 is represented by an arc or a straight line is determined by whether the part is curved with respect to the line segment connecting both ends of the part. If a part is curved with respect to the line segment connecting both ends of the part, the part is determined to be represented by an arc. In this case, the point of intersection of the part and the perpendicular bisector of the line segment connecting both ends of the part is defined as the center of the part, and an arc passing through both ends and the center of the part is used as an arc that represents this part. If a part is not curved with respect to the line segment connecting both ends of the part, this is the case where the part is represented by a straight line, and thus this part is determined to be represented by a straight line.

In the tire 2, when a contour line represented by an arc or a straight line is an approximate contour line, from the viewpoint of increasing the conformity between the shape of the part and the approximate contour line, the distance from the approximate contour line to the part, measured along a normal line of the approximate contour line, is preferably not greater than 3%, and more preferably not greater than 1%, of the length of the line segment connecting both ends of the part.

As described above, the tread surface 20 includes the center portion C including the equator PC and the pair of the shoulder portions S each including the end PE of the tread surface 20.

In the tire 2, a degree of curvature Bc of the center portion C is represented by the average of the radii of the arcs that respectively represent the two first parts P1 including the equator PC. Specifically, the degree of curvature Bc of the center portion C is represented by the average of the radius R1$a$ of the arc that represents the first part P1$a$ in the first zone and the radius R1$b$ of the arc that represents the first part P1$b$ in the second zone.

A degree of curvature Bs of each shoulder portion S is represented by the radius of the arc having a larger radius, out of the arc that represents the fifth part P5$a$ including the first end PEa of the tread surface 20 and the arc that represents the fifth part P5$b$ including the second end PEb of the tread surface 20. In the case where the arc that represents the fifth part P5$a$ and the arc that represents the fifth part P5$b$ have the same radius, the degree of curvature Bs of the shoulder portion S is represented by the radius of the arc that represents any of these parts.

As described above, the tread 4 is formed from a crosslinked rubber, and the tire 2 comes into contact with a road surface at the tread surface 20.

In general, when stress acts on a crosslinked rubber, the crosslinked rubber becomes deformed. For example, the road surface of a circuit course is made of asphalt, and irregularities exist on the road surface. A tire supports a vehicle body and a rider. A load is applied to a tread that is in contact with a road surface. Due to the application of the load, stress acts on the tread. The tread surface becomes deformed according to the irregularities of the road surface. The area in which the tread surface is actually in contact with the ground (hereinafter, referred to as actual ground-contact area) increases. The frictional force of the tread against the road surface increases.

As the load applied to the crosslinked rubber is increased and the stress acting on the crosslinked rubber is increased, the crosslinked rubber becomes compressed and eventually hardens. The hardening apparently decreases the coefficient of friction of the crosslinked rubber. During cornering in which a large load is applied to the tire, the frictional force of the tread may be decreased due to this hardening. If the tread cannot maintain a high frictional force, even if vehicle attitude control is made electronic and the vehicle can stably run in a full bank state, the vehicle cannot sufficiently exhibit its performance.

In the tire 2, the degree of curvature Bs of the shoulder portion S is higher than the degree of curvature Bc of the center portion C. The shoulder portion S is flatter than the center portion C. The shoulder portion S contributes to an increase in the ground-contact area during cornering. In the tire 2, the stress acting on the tread 4 in a full bank state can be reduced. The reduction of the stress suppresses the progress of hardening due to application of a load. In a full bank state, the tread 4 can exert a high frictional force against a road surface. The tire 2 can exert a high grip force in a full bank state.

In the tire 2, the ratio (Bs/TW) of the degree of curvature Bs of the shoulder portion S to the width TW of the tread surface 20 is not less than 50%.

The shoulder portion S contributes to an increase in the ground-contact area during cornering. The stress acting on the tread 4 in a full bank state can be reduced. The progress of hardening due to application of a load is suppressed. The tire 2 can exert a high grip force in a full bank state. From this viewpoint, the ratio (Bs/TW) is preferably not less than 60% and more preferably not less than 70%.

From the viewpoint that, when a running state shifts from cornering to straight running, the overturning moment required to raise the vehicle is sufficiently obtained and good lightness can be maintained, the ratio (Bs/TW) is preferably not greater than 200% and more preferably not greater than 150%.

In the tire 2, the ratio (Bc/TW) of the degree of curvature Bc of the center portion C to the width TW of the tread surface 20 is not greater than 70%.

In the tire 2, the center portion C is moderately rounded. The center portion C contributes to the ease of tilting the vehicle. The vehicle on which the tire 2 is mounted easily shifts from straight running to cornering. The tire 2 contributes to improvement of lightness. From this viewpoint, the ratio (Bc/TW) is preferably not greater than 60% and more preferably not greater than 50%.

The ratio (Bc/TW) is preferably not less than 10%. Accordingly, the roundness of the center portion C is appropriately maintained. The center portion C contributes to the ease of raising the vehicle. The vehicle on which the tire 2 is mounted easily shifts form cornering to straight running. With the tire 2, good lightness is maintained. From this viewpoint, the ratio (Bc/TW) is more preferably not less than 15% and further preferably not less than 20%.

As described above, in the tire 2, the second part P2, the third part P3, and the fourth part P4 which are located between the first part P1 and the fifth part P5 of each zone in the contour line of the tread surface 20 are each represented by an arc or a straight line. In other words, the three parts located between the first part P1 including the equator PC and the fifth part P5 including the end PE of the tread surface 20 are each represented by an arc or a straight line. Accordingly, the tread surface 20 having a smooth contour line is formed.

The tire 2 can smoothly shift from straight running to cornering or from cornering to straight running. The tire 2 has good transient characteristics.

The tire 2 can exert a high grip force in a full bank state without impairing transient characteristics. Moreover, the tire 2 has good lightness. The tire 2 has excellent cornering performance. The tire 2 allows the performance of the vehicle to be sufficiently exhibited.

In the tire 2, preferably, at least one part out of the three located between the first part P1 including the equator PC and the fifth part P5 including the end PE of the tread surface 20 is represented by an arc.

Accordingly, non-linear changes in physical actions such as frictional forces and moments caused by the boundaries between the parts when the running state shifts from straight running to cornering or from cornering to straight running are suppressed. The tire 2 can smoothly shift from straight running to cornering or from cornering to straight running. The tire 2 has good transient characteristics. The good transient characteristics contribute to improvement of lightness. From this viewpoint, in the tire 2, more preferably, as in the contour line of the tread surface 20 shown in FIG. 3, the three parts located between the first part P1 including the equator PC and the fifth part P5 including the end PE of the tread surface 20 are all represented by arcs.

In the contour line of the tread surface 20 shown in FIG. 3, the radius R2 of the arc that represents the second part P2 located on the end PE side of the tread surface 20 with respect to the first part P1 is larger than the radius R1 of the arc that represents the first part P1 located on the equator PC side with respect to the second part P2. The radius R3 of the arc that represents the third part P3 located on the end PE side of the tread surface 20 with respect to the second part P2 is larger than the radius R2 of the arc that represents the second part P2 located on the equator PC side with respect to the third part P3. The radius R4 of the arc that represents the fourth part P4 located on the end PE side of the tread surface 20 with respect to the third part P3 is larger than the radius R3 of the arc that represents the third part P3 located on the equator PC side with respect to the fourth part P4. The radius R5 of the arc that represents the fifth part P5 located on the end PE side of the tread surface 20 with respect to the fourth part P4 is larger than the radius R4 of the arc that represents the fourth part P4 located on the equator PC side with respect to the fifth part P5.

In the tire 2, between the equator PC and the end PE of the tread surface 20, the radius of the arc that represents the part located on the end PE side of the tread surface 20 is larger than the radius of the arc that represents the part located on the equator PC side.

In the tire 2, between the equator PC and the end PE of the tread surface 20, the plurality of arcs included in the contour line are formed such that the radii thereof gradually increase from the inner side toward the outer side in the axial direction. In the tire 2, non-linear changes in physical actions caused by the boundaries between the parts when the running state shifts from straight running to cornering or from cornering to straight running are effectively suppressed. The tire 2 can smoothly shift from straight running to cornering or from cornering to straight running. The tire 2 has good transient characteristics. The good transient characteristics contribute to improvement of lightness. A large ground-contact surface is formed during cornering, so that the tire 2 can exert a high grip force. From this viewpoint, in the tire 2, between the equator PC and the end PE of the tread surface 20, the radius of the arc that represents the part located on the end PE side of the tread surface 20 is preferably larger than the radius of the arc that represents the part located on the equator PC side. Specifically, as for two adjacent arcs, the ratio of the radius of the arc that represents the part located on the end PE side of the tread surface 20 to the radius of the arc that represents the part located on the equator PC side is more preferably not less than 115% and not greater than 155%.

In the case where all the parts included in the contour line of the tread surface 20 are represented by arcs as shown in FIG. 3, from the viewpoint that the tire 2 can exert a high grip force during cornering without impairing transient characteristics, the ratio (R2/R1) of the radius R2 of the arc that represents the second part P2, to the radius R1 of the arc that represents the first part P1, is preferably not less than 115% and not greater than 155%. The ratio (R3/R2) of the radius R3 of the arc that represents the third part P3, to the radius R2 of the arc that represents the second part P2, is preferably not less than 115% and not greater than 155%. The ratio (R4/R3) of the radius R4 of the arc that represents the fourth part P4, to the radius R3 of the arc that represents the third part P3, is preferably not less than 115% and not greater than 155%. The ratio (R5/R4) of the radius R5 of the arc that represents the fifth part P5, to the radius R4 of the arc that represents the fourth part P4, is preferably not less than 115% and not greater than 155%.

In the tire 2, the ratio (Bc/Bs) of the degree of curvature Bc of the center portion C to the degree of curvature Bs of the shoulder portion S is preferably not greater than 50%. In the tire 2, the degree of curvature Bc of the center portion C is sufficiently lower than the degree of curvature Bs of the shoulder portion S. With the tire 2, good lightness is achieved. The tire 2 can shift its state from a standing state to a full bank state at once. Since the degree of curvature Bs of the shoulder portion S is sufficiently higher than the degree of curvature Bc of the center portion C, the tire 2 can exert a high grip force in a full bank state. From this viewpoint, the ratio (Bc/Bs) is more preferably not greater than 45% and further preferably not greater than 40%.

From the viewpoint that a sufficient ground-contact area is obtained and good braking performance can be maintained during straight running, the ratio (Bc/Bs) is preferably not less than 10%, more preferably not less than 15%, and further preferably not less than 20%.

In the tire 2, the difference (Hc−Hs) between a hardness Hc of the center portion C and a hardness Hs of the shoulder portion S is preferably not less than −5 and not greater than 5.

In the tire 2, the center portion C and the shoulder portion S have substantially the same hardness. In the tire 2, non-linear changes in physical actions caused by the boundaries between the parts when the running state shifts from straight running to cornering or from cornering to straight running are effectively suppressed. The tire 2 can smoothly shift from straight running to cornering or from cornering to straight running. The tire 2 has good transient characteristics. The good transient characteristics contribute to improvement of lightness. From this viewpoint, the difference (Hc−Hs) between the hardness Hc of the center portion C and the hardness Hs of the shoulder portion S is more preferably not less than −3 and not greater than 3. In this case, from the viewpoint of obtaining better transient characteristics and lightness, the hardness difference between the adjacent parts is preferably not less than −5 and not greater than 5 and more preferably not less than −3 and not greater than 3.

In the present disclosure, the hardness of each part is measured according to the standards of JIS K6253 under a temperature condition of 23° C. by pressing a type A durometer against the center in the width direction of the part.

In FIG. 2, each solid line LB4 represents the boundary B4 between the fourth part P4 and the fifth part P5. As shown in FIG. 2, in the tire 2, no groove 22 is formed between each end PE of the tread surface 20 and each boundary B4, that is, in each fifth part P5 including the end PE of the tread surface 20.

The fifth part P5 comes into contact with a road surface in a full bank state. Since no groove 22 is formed in the fifth part P5, the tire 2 is in sufficient contact with the road surface in a full bank state. The fifth part P5 contributes to exertion of a high grip force in a full bank state. From this viewpoint, in the tire 2, preferably, no groove 22 is formed in the fifth part P5 including the end PE of the tread surface 20.

As described above, according to the present invention, the motorcycle tire 2 capable of exerting a high grip force in a full bank state without impairing transient characteristics, is obtained.

EXAMPLES

The following will describe the present invention in further detail by means of examples, etc., but the present invention is not limited to these examples.

Example 1

A motorcycle pneumatic tire (tire size=200/55ZR17) having the basic structure shown in FIG. 1 and having specifications shown in Table 1 below was obtained.

In Example 1, the ratio (Bc/Bs) of the degree of curvature Bc of the center portion to the degree of curvature Bs of the shoulder portion was 29%. The ratio (Bs/TW) of the degree of curvature Bs of the shoulder portion to the width TW of the tread surface was 123%. The ratio (Bc/TW) of the degree of curvature Bc of the center portion to the width TW of the tread surface was 36%.

A contour line having the configuration shown in FIG. 3 was adopted as the contour line of the tread surface. The ten parts included in the contour line were all arcs. The contour line is symmetrical about the equator plane. As for each of the parts of the first zone and the second zone, the radius of the arc representing each part is shown as an index with the radius R5 of the arc representing the fifth part P5 being regarded as 100.

The difference (Hc−) between the hardness Hc of the center portion and the hardness Hs of the shoulder portion was 3.

As shown in the cell for Pattern in Table 1, grooves were formed on the tread surface, and the tread pattern having the specifications shown in FIG. 2 was formed.

Comparative Example 1

A tire of Comparative Example 1 was obtained in the same manner as Example 1, except that the radius R1, the radius R2, the radius R3, the radius R4, and the radius R5 were changed such that the ratio (Bc/Bs), the ratio (Bc/TW), and the ratio (Bs/TW) were set as shown in Table 1 below.

Example 2

A tire of the Example 2 was obtained in the same manner as Example 1, except that no groove was formed on the tread surface.

Example 3

A tire of Example 3 was obtained in the same manner as Example 1, except that the radius R1, the radius R2, the radius R3, and the radius R4 were changed such that the ratio (Bc/Bs) and the ratio (Bc/TW) were set as shown in Table 1 below.

Comparative Example 2

A tire of Comparative Example 2 was obtained in the same manner as Example 1, except that the radius R2, the radius R3, the radius R4, and the radius R5 were changed such that the ratio (Bc/Bs) and the ratio (Bs/TW) were set as shown in Table 2 below.

Example 4

A tire of Example 4 was obtained in the same manner as Example 1, except that the difference (Hc−Hs) was set as shown in Table 2 below.

Example 5

A tire of Example 5 was obtained in the same manner as Example 1, except that the fourth part P4 of each zone was formed as a straight line. The fact that the fourth part P4 was formed as a straight line is represented as "S" in Table 2.

[Performance Evaluation (1)]

Each test tire was fitted onto a normal rim and inflated with air to adjust the internal pressure of the tire to a normal internal pressure. The tire was mounted to the rear wheel of a motorcycle having an engine displacement of 999 cc. A commercially available tire (size: 120/70ZR17) was mounted to the front wheel. A normal rim was used as the rim, and the internal pressure was adjusted to a normal internal pressure. The motorcycle was caused to run on a circuit course having an asphalt road surface, and sensory evaluation was made by the rider. The evaluation items are lightness, transient characteristics, and grip force in a full bank state. The results are shown as indexes in Table 1 and Table 2 below. A higher value indicates a better result.

[Performance Evaluation (2)]

Each test tire was fitted onto a normal rim and inflated with air to adjust the internal pressure of the tire to a normal internal pressure. The tire was mounted to the rear wheel of a motorcycle having an engine displacement of 999 cc. A commercially available tire (size: 120/70ZR17) was mounted to the front wheel. A normal rim was used as the rim, and the internal pressure was adjusted to a normal internal pressure. The motorcycle was caused to run on a circuit course having an asphalt road surface, and lap times were measured. A commercially available tire was used as a reference tire, and the time shortened from the lap time when the reference tire was used was obtained. The results are shown as an index in the cell for "Section time" in Table 1 and Table 2 below. A higher value indicates a better result.

TABLE 1

|  | Comparative Example 1 | Example 2 | Example 1 | Example 3 |
|---|---|---|---|---|
| Pattern | FIG. 2 | — | FIG. 2 | FIG. 2 |
| Bc/Bs [%] | 122 | 29 | 29 | 50 |
| Bc/TW [%] | 56 | 36 | 36 | 62 |
| Bs/TW [%] | 46 | 123 | 123 | 123 |
| R1 | 122 | 29 | 29 | 50 |
| R2 | 122 | 40 | 40 | 60 |
| R3 | 122 | 48 | 48 | 72 |
| R4 | 122 | 71 | 71 | 86 |
| R5 | 100 | 100 | 100 | 100 |
| Hc − Hs | 3 | 3 | 3 | 3 |
| Section time | 100 | 130 | 120 | 110 |
| Lightness | 100 | 110 | 110 | 105 |
| Transient characteristics | 100 | 110 | 110 | 100 |
| Grip | 100 | 130 | 120 | 120 |

TABLE 2

|  | Comparative Example 2 | Example 4 | Example 5 |
|---|---|---|---|
| Pattern | FIG. 2 | FIG. 2 | FIG. 2 |
| Bc/Bs [%] | 90 | 29 | 29 |
| Bc/TW [%] | 36 | 36 | 36 |
| Bs/TW [%] | 40 | 123 | 123 |
| R1 | 90 | 29 | 29 |
| R2 | 92 | 40 | 40 |
| R3 | 95 | 48 | 48 |
| R4 | 98 | 71 | S |
| R5 | 100 | 100 | 100 |
| Hc − Hs | 3 | 5 | 3 |
| Section time | 80 | 115 | 115 |
| Lightness | 80 | 105 | 105 |
| Transient characteristics | 80 | 105 | 105 |
| Grip | 80 | 125 | 115 |

As shown in Table 1 and Table 2, it is confirmed that, in each Example, a high grip force can be exerted in a full bank state without impairing transient characteristics. From the evaluation results, advantages of the present invention are clear.

INDUSTRIAL APPLICABILITY

The above-described technology capable of exerting a high grip force in a full bank state without impairing transient characteristics can also be applied to various tires.

REFERENCE SIGNS LIST 2 tire
4 tread
20 tread surface
22 groove
24 inclined groove
34 side surface
C center portion
S shoulder portion
P1 first part
P2 second part
P3 third part
P4 fourth part
P5 fifth part

The invention claimed is:

1. A motorcycle tire comprising a tread surface having a shape projecting radially outward, wherein
the tread surface includes a center portion including an equator, and a pair of shoulder portions including ends of the tread surface, respectively,
a zone from the equator to each end of the tread surface, of a contour line of the tread surface, is divided into five equal sections, whereby the contour line is divided into ten parts,
the zone from the equator to each end of the tread surface has five parts being a first part, a second part, a third part, a fourth part, and a fifth part from the equator toward the end of the tread surface,
among the ten parts, two first parts including the equator are each represented by a single arc, and two fifth parts including the ends of the tread surface, respectively, are each represented by a single arc,
each of the second part, the third part and the fourth part located between each first part including the equator and each fifth part including the end of the tread surface is represented by a single arc,
a degree of curvature of the center portion is represented by an average of radii R1 of the single arcs that represent the two first parts including the equator, respectively,
a degree of curvature of each shoulder portion is represented by a radius of a single arc having a larger radius R5, out of the single arc that represents the fifth part including a first end of the tread surface and the single arc that represents the fifth part including a second end of the tread surface,
the degree of curvature of the shoulder portion is higher than the degree of curvature of the center portion,
a ratio of the degree of curvature of the shoulder portion to a width of the tread surface is not less than 50%,
a ratio of the degree of curvature of the center portion to the width of the tread surface is not greater than 70%,
in the zone, a radius R2 of each of the single arcs that represents the second parts is larger than the radius R1 of each of the single arcs that represents the two first parts, a radius R3 of each of the single arcs that represents the third parts is larger than the radius R2, a radius R4 of each of the single arcs arc that represents the fourth parts is larger than the radius R3, the radius R5 of each of the single arcs is larger than the radius R4, and each of a ratio R2/R1 of the radius R2 to the radius R1, a ratio R3/R2 of the radius R3 to the radius R2, a ratio R4/R3 of the radius R4 to the radius R3, and a ratio R5/R4 of the radius R5 to the radius R4 is different from all other ratios and is not less than 115% and not greater than 155%.

2. The motorcycle tire according to claim 1, wherein a ratio of the degree of curvature of the center portion to the degree of curvature of the shoulder portion is not greater than 50%.

3. The motorcycle tire according to claim 1, wherein a difference between a hardness of the center portion and a hardness of the shoulder portion is not less than −5 and not greater than 5.

4. The motorcycle tire according to claim 1, wherein no groove is formed in the fifth parts including the ends of the tread surface, respectively.

\* \* \* \* \*